United States Patent
Walkington

(10) Patent No.: US 8,169,295 B2
(45) Date of Patent: May 1, 2012

(54) MANUALLY OPERABLE POSITION SENSOR

(75) Inventor: Stuart Mark Walkington, St Albans (GB)

(73) Assignee: Peratech Limited, Richmond (GB)

( * ) Notice: Subject to any disclaimer, the term of this patent is extended or adjusted under 35 U.S.C. 154(b) by 337 days.

(21) Appl. No.: 12/298,327

(22) PCT Filed: Apr. 24, 2007

(86) PCT No.: PCT/GB2007/001482
§ 371 (c)(1),
(2), (4) Date: Dec. 9, 2009

(87) PCT Pub. No.: WO2007/125298
PCT Pub. Date: Nov. 8, 2007

(65) Prior Publication Data
US 2010/0102922 A1    Apr. 29, 2010

(30) Foreign Application Priority Data
Apr. 27, 2006   (GB) ................... 0608329.9

(51) Int. Cl.
*H01C 10/10* (2006.01)
(52) U.S. Cl. ............. 338/47; 338/99; 338/114; 338/210
(58) Field of Classification Search .......... 338/99, 338/101, 114, 47, 208, 210
See application file for complete search history.

(56) References Cited

U.S. PATENT DOCUMENTS

| | | | |
|---|---|---|---|
| 6,210,771 B1 * | 4/2001 | Post et al. ............ | 428/100 |
| 6,714,117 B2 | 3/2004 | Sandbach | |
| 2003/0211797 A1 * | 11/2003 | Hill et al. ............ | 442/205 |
| 2004/0252007 A1 | 12/2004 | Lussey et al. | |
| 2005/0069695 A1 * | 3/2005 | Jung et al. .......... | 428/328 |
| 2005/0073685 A1 * | 4/2005 | Arai .................. | 356/419 |

FOREIGN PATENT DOCUMENTS

| | | |
|---|---|---|
| GB | 2341037 A | 3/2000 |
| GB | 2341978 A | 3/2000 |
| GB | 2343516 A | 5/2000 |
| GB | 2365134 A | 2/2002 |
| WO | 01/75778 A1 | 10/2001 |
| WO | 03/094187 A1 | 11/2003 |
| WO | 2005/001865 A1 | 1/2005 |

* cited by examiner

*Primary Examiner* — Kyung Lee
(74) *Attorney, Agent, or Firm* — Harness, Dickey & Pierce, P.L.C.

(57) ABSTRACT

A manually operable position sensor is shown, for providing control signals to an electronic device, such as an audio player. A fabric ribbon (101) has a length substantially longer than its width with insulating yarns and electrically conducting yarns included therein. The conducting yarns define three conductive tracks (103, 104, 105) running the length of the fabric. The conductive tracks are configured to interface with an electronic device at a first end. At a second end, an active region of the fabric forms part of a sensor assembly that is receptive to a manually applied pressure.

19 Claims, 6 Drawing Sheets

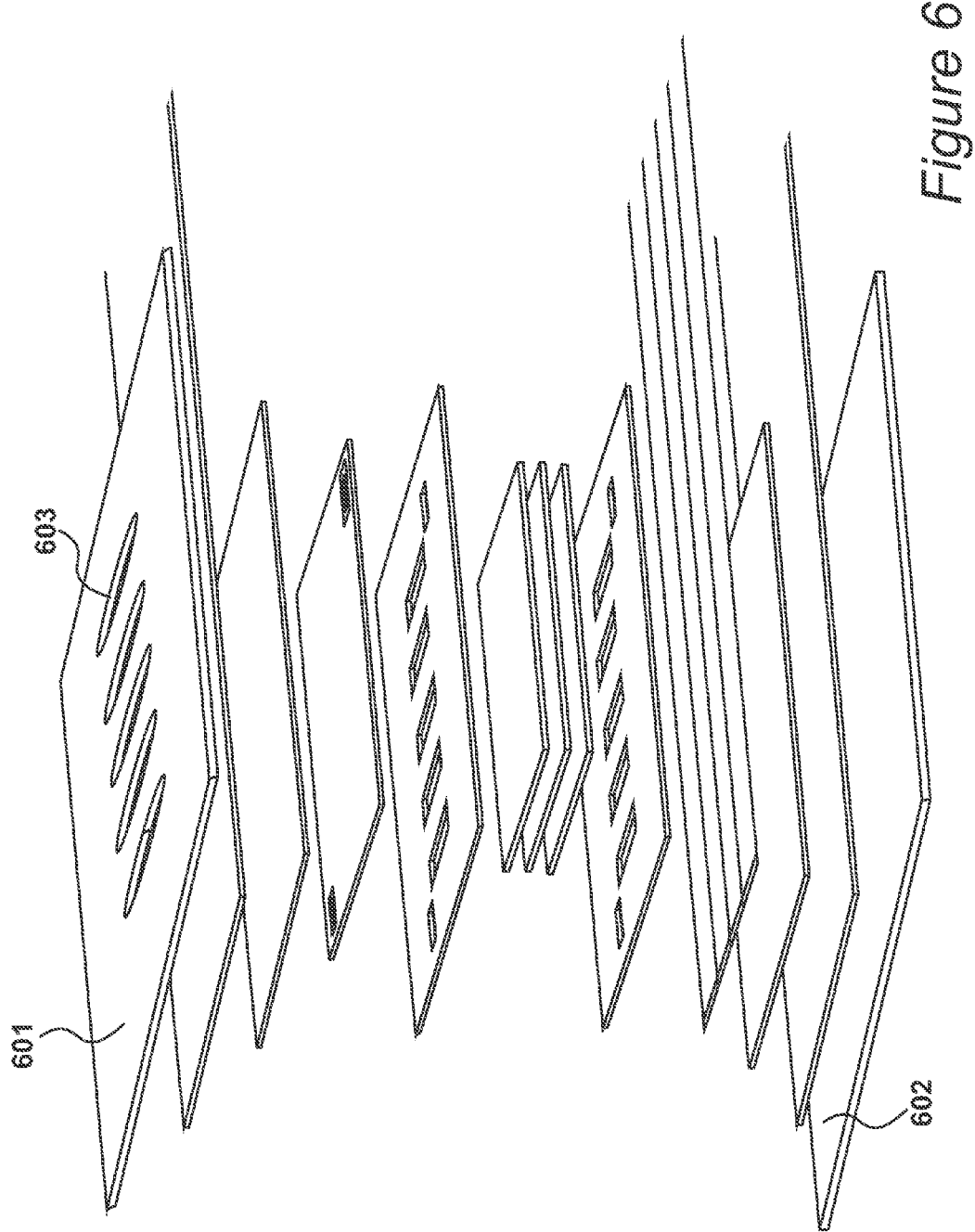

MANUALLY OPERABLE POSITION SENSOR

CROSS REFERENCE TO RELATED APPLICATIONS

This application claims priority from United Kingdom patent application number 0608329.9 filed 27 Apr. 2006, the entire contents of which are incorporated herein by reference.

TECHNICAL FIELD

The present invention relates to a manually operable position sensor for providing control signals to an electronic device.

BACKGROUND OF THE INVENTION

A manually operable position sensor is disclosed in U.S. Pat. No. 6,452,479, assigned to the present applicant. It is known for sensors of this type to communicate with electronic devices. In order to provide electrical communication between a sensor assembly and the electronic device, it is necessary to define tracks for electrical conduction. In known assemblies, these tracks are provided using electrically conductive tape surrounded by an insulating material. The tape itself is relatively expensive and, furthermore, costs are involved in terms of creating the assembly itself.

BRIEF SUMMARY OF THE INVENTION

According to an aspect of the present invention, there is provided a manually operable position sensor for providing control signals to an electronic device. The position sensor comprises fabric having a length substantially longer than its width with insulating yarns and electrically conducting yarns included therein, such that conducting yarns define three conductive tracks running the length of said fabric. The conductive tracks are connectable to an electrical connector at a first end for interfacing with an electronic device and at a second end, an active region of the fabric forms part of a sensor assembly that is receptive to a manually applied pressure.

BRIEF DESCRIPTION OF THE SEVERAL VIEWS OF THE DRAWINGS

FIG. 6 illustrates further additional elements.

DESCRIPTION OF THE BEST MODE FOR CARRYING OUT THE INVENTION

Figure 1:
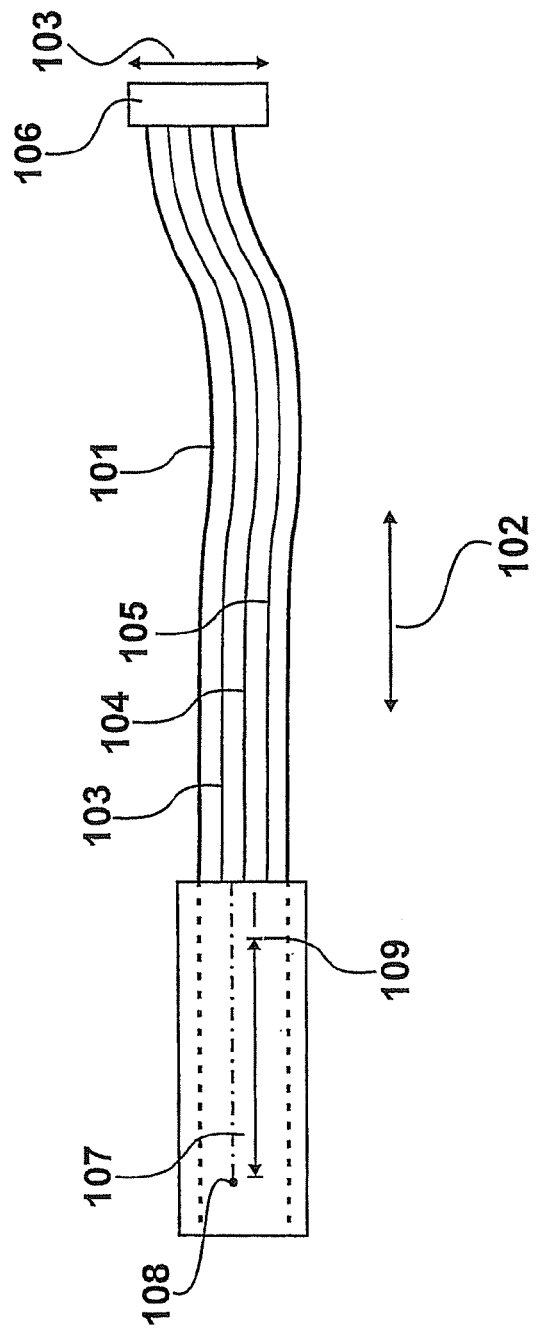
FIG. 1 shows an embodiment of a manually operable positions sensor.

An embodiment of a manually operable position sensor is illustrated in FIG. 1. A fabric strip or ribbon 101 has a length, illustrated by arrows 102, that is substantially longer than its width, illustrated by arrow 103. For example, the length of ribbon 101 may be typically seven hundred and fifty millimetres with a typical width of twenty-five millimetres. The fabric has electrically insulating yarns and electrically conducting yarns included therein. The conducting yarns define three conductive tracks 103, 104 and 105 that are connected to an electrical connector 106. The electrical connector is provided to facilitate the interfacing of the sensor with an electronic device. At its opposite end, an active region 107 of the fabric forms part of a sensor assembly that is receptive to a manually applied pressure.

In a preferred sensor, the fabric is produced by a weaving process in which weft yarns are woven between warp yarns and the conducting yarns, that form tracks 103, 104 and 105, are included as part of the warp yarns. Thus, as the fabric is woven, it is produced in the direction indicated by arrow 102.

In a preferred embodiment, the conductive yarns are silver coated nylon and each conductive track 103 to 105 may have between five and ten conducting yarns, with seven conducting yarns being present in a preferred embodiment.

In a preferred embodiment, the spacing between the conductive tracks (the insulating portions) is such that it is greater than the width if the conducting tracks themselves. Preferably, the spacing is made consistent with readily available circuit connectors, such as circuit connector 106 that, typically, facilitates a spacing of two point five millimetres (2.5 mm). Thus, if alternate connections are selected, a spacing of five millimetres (5 mm) is achievable, as is preferred in the present embodiment.

In a preferred embodiment, active region 107 forms part of an analogue sensor in which the position of manually applied pressure is determined by measuring the voltage across two of the conductive tracks. Thus, in this way, it is possible to determine the position of manually applied pressure in the direction of arrow 102. Thus, the sensor is essentially one-dimensional and is not applicable for applications where position detection is required in the direction of arrow 103, for example.

As an analogue sensor, upper track 103 may apply plus volts to a position 108 of the active region. Similarly, track 105 may apply zero volts to a position 109 of the active region. At a position where pressure is applied, causing a mechanical interaction, a potential divider is created that applies a voltage to the central track 104. Thus, in direction of arrow 102, pressure applied closer to position 108 will return a higher voltage, while pressure applied and closer to position 109 will return a lower voltage. Functions may be associated with particular positions on the sensor, such that, for example, the range of the sensor may be divided between five locations and the position of these locations may be emphasised by the provision of masking. Thus, by measuring the returned voltage, it is possible to perform a comparison operation and thereby determine the actual function that has been selected.

Figure 2:
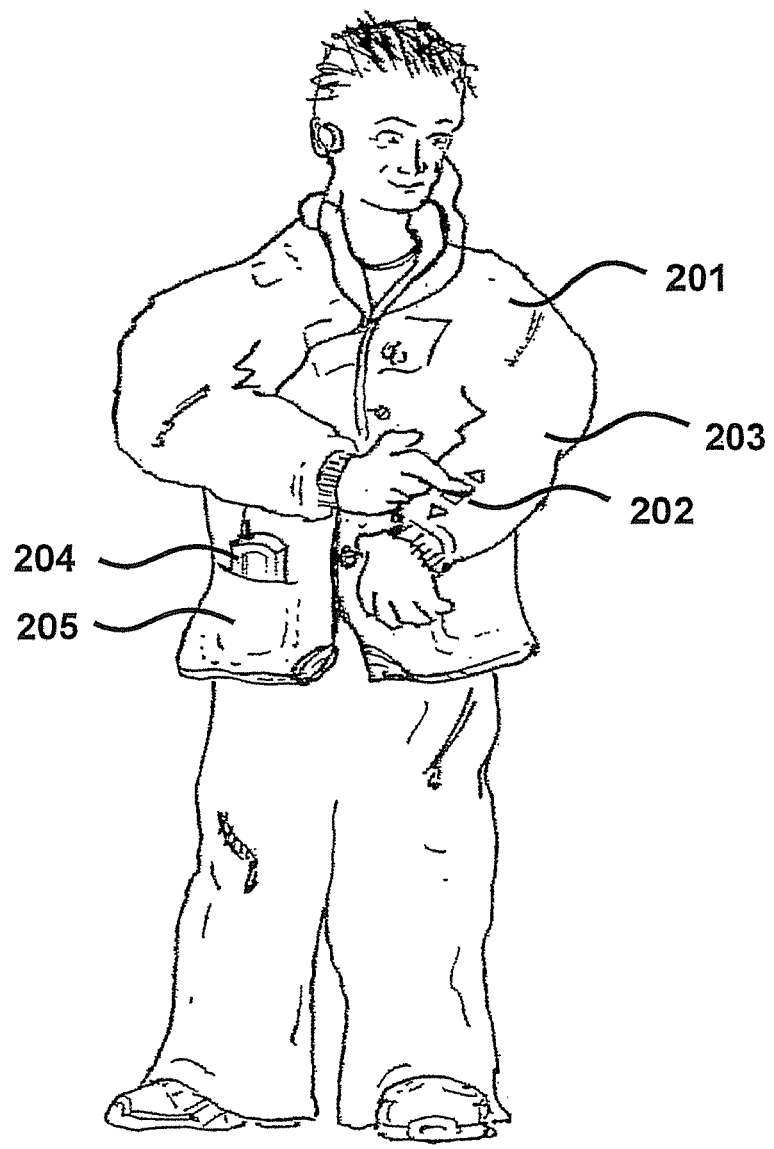
FIG. 2 shows an example of an application for the sensor identified in FIG. 1.

An example of an application for the sensor is shown in FIG. 2. In this example, the sensor is included in a jacket 201 (such as a jacket suitable for sports activities). A manually operable data input device 202, operating in accordance with the sensor technology of the preferred embodiment, is fabricated into an arm 203 of the jacket. The data input device is configured to receive input data from a user which, for example, may include commands for controlling a mobile device such as a radio device, a mobile telephone or an audio player, such as an MP3 player. Thus, an MP3 player 204 could be located in an external pocket 205 or in an internal pocket located at any appropriate position within the jacket. It is then possible for interface electronics, as described in the applicant's aforesaid US patent, to provide an interface between the sensor and the MP3 player, for example.

Figure 3:
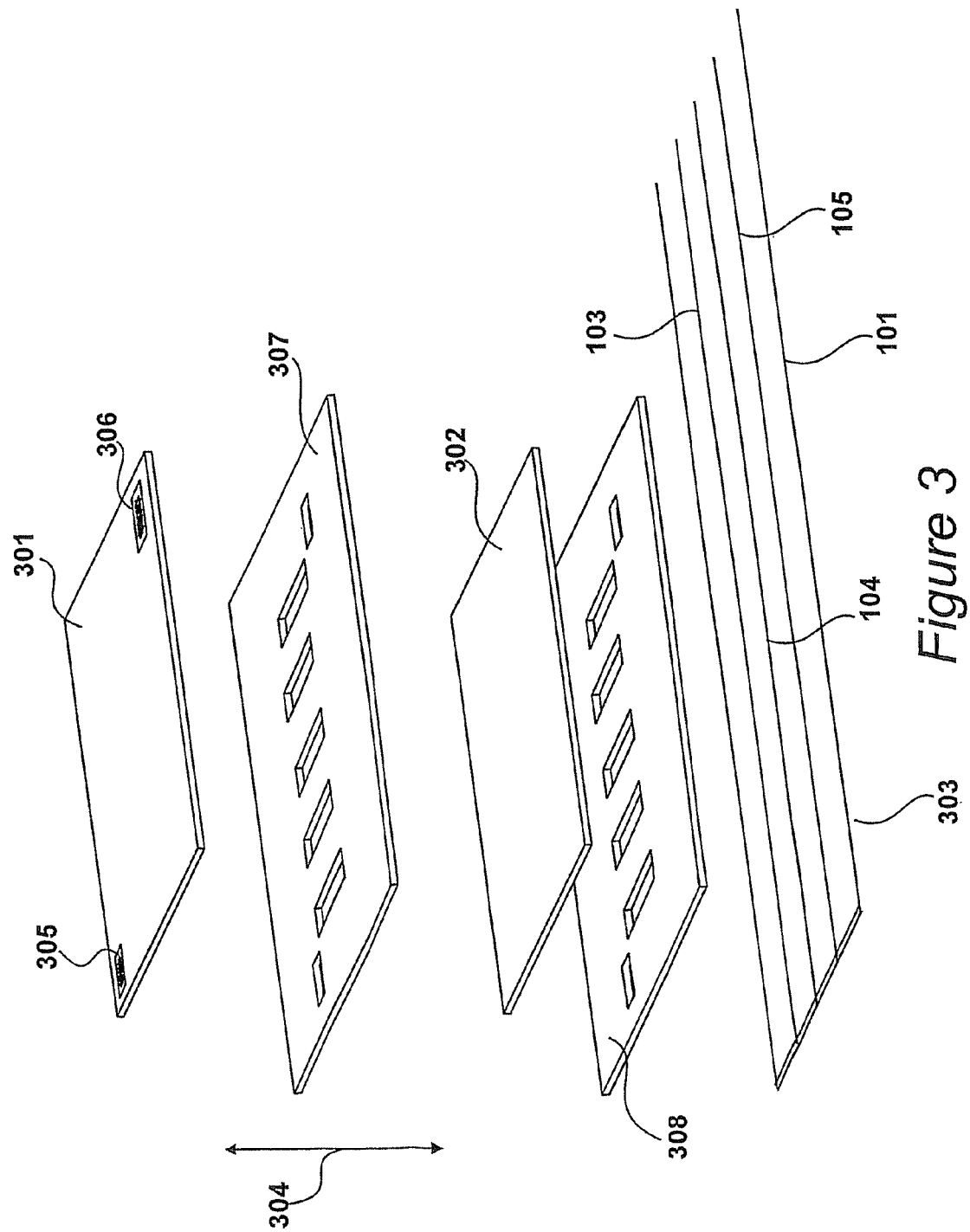
FIG. 3 shows a sensor construction.

An example of a sensor construction is illustrated in FIG. 3. The sensor includes a first conductive plane 301 and a separation layer 302 which is placed between the first conductive plane 301 and an active region 303 of a fabric 101. In FIG. 3, an exploded view is presented but it will be appreciated that, in use, the individual layers are placed in contact. In addition, electrical conduction in the vertical direction, illustrated by arrow 304, is provided by stitching through the layers using conductive threads.

Thus, by the provision of stitching, the first track 103 is electrically connected to a first corner 305 of conductive layer 301. Similarly, track 105 is electrically connected to an opposite corner 306 of the conductive layer 301. Preferably, conductive layer 301 is constructed from carbonised nylon.

Without pressure being applied, separation layer 302 prevents conductive layer 301 from being placed into contact with the central track 104. However, when pressure is applied, separation layer 302 is compressed and as such electrical connection takes place at the position of the mechanical interaction, that is, where the pressure is applied.

To facilitate the detection of the specific position of mechanical interaction, masking means are provided. In the preferred embodiment, the masking means includes a first mask 307 and a second mask 308. The first mask 307 is located above the separation layer 302 and the second mask 308 is located below the separation layer.

Figure 4:
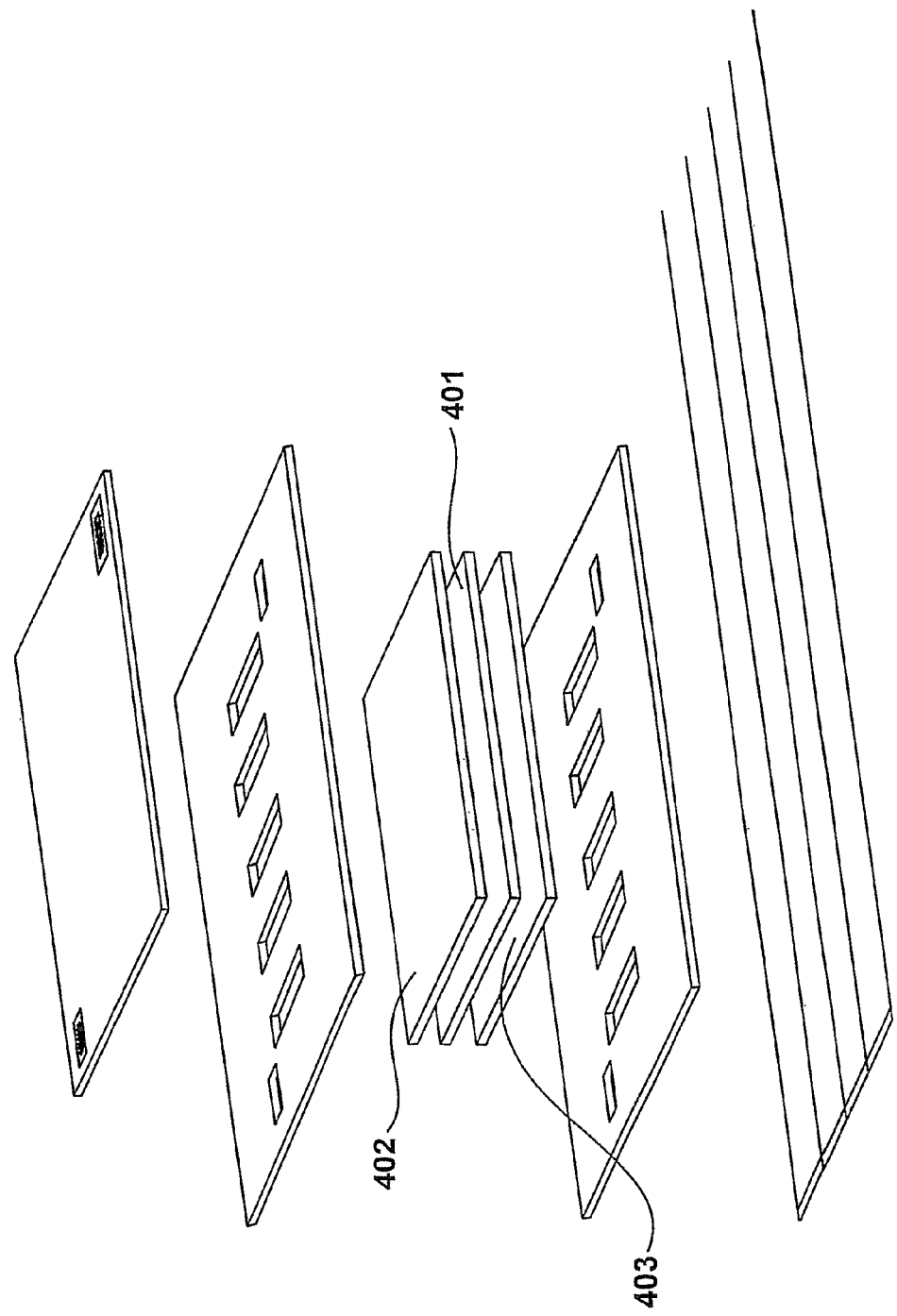
FIG. 4 shows an enhancement to the construction of FIG. 3.

An enhanced embodiment is illustrated in FIG. 4 that deploys additional component layers similar to those disclosed in the aforesaid US patent assigned to the present applicant. In this preferred embodiment, the single separation layer 302 is replaced with three separate layers, a central layer 401 being conductive, while an upper layer 402 is an insulating separator layer and a lower layer 403 is also an insulating separator layer. In this configuration, conduction occurs when manual pressure is applied. However, the provision of the additional layers prevents accidental triggering when, for example, the material is bent or folded. In addition, it will be appreciated that other technical solutions may be provided to give the functionality of the separation layer.

Figure 5:
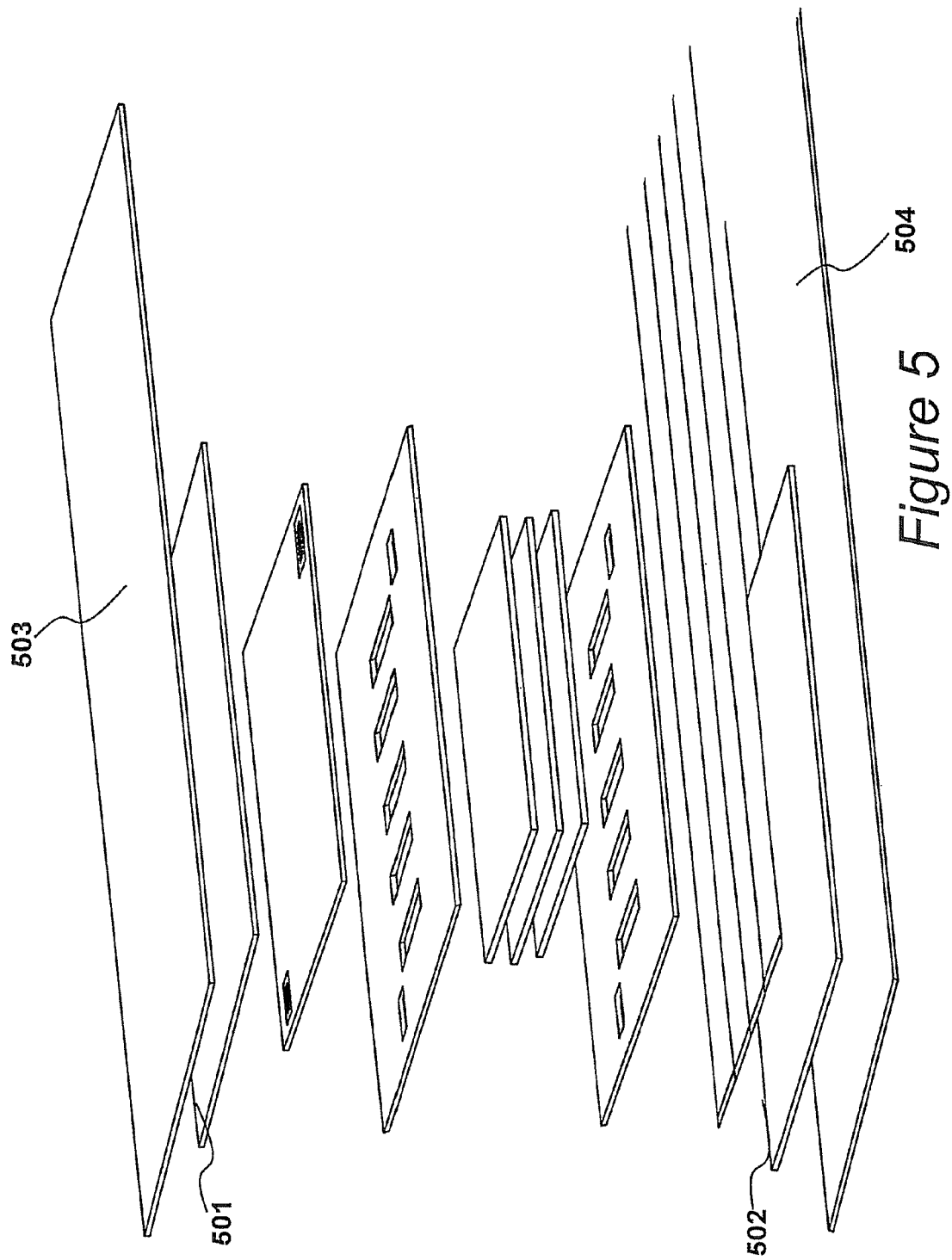
FIG. 5 illustrates additional elements of a construction.

As illustrated in FIG. 5, an upper cover 501 is preferably provided, along with a lower cover 502 which protect the operation of the sensor in the active region. Furthermore, an upper waterproof cover 503 and a lower waterproof cover 504 are provided that run the length of the sensor from the active region to the electrical connector 106.

As illustrated in FIG. 6, further material is provided at 601 and 602 to facilitate the sewing of the sensor into a bag, jacket (as illustrated in FIG. 2) or other material environment so as to ensure robust operation. In addition, the upper cover 601 may include graphical representations, illustrated at 603 which relate to particular device functions. Thus, in the example shown in FIG. 2, in which the device is used to control an audio player, these graphical representations relate to particular operations of the player, such as track selection and audio control.

In summary, it will be appreciated that the position sensor may be constructed by firstly weaving a fabric with electrically conducting warp yarns that define three conductive tracks that run the length of the fabric. An electrical connector is connected to the conductive tracks at a first end to facilitate the interfacing of the sensor with an electronic device, such as an MP3 player. Then, at a second end, a sensor assembly is formed that is receptive to manually applied pressure over an active region of the fabric.

The invention claimed is:

1. A manually operable position sensor for providing control signals to an electronic device, comprising:
a fabric ribbon having a length substantially longer than its width with insulating yarns and electrically conducting yarns included therein, such that said conducting yarns define a first conductive track, a second conductive track and a third conductive track, each said conductive track running the length of said fabric ribbon;
said conductive tracks are configured to interface with an electronic device; and
an active region of the fabric ribbon forms part of an analog sensor assembly that is receptive to a manually applied pressure, the position of said manually applied pressure is determined by measuring a voltage across two of the conductive tracks; and
said sensor has a first conductive fabric plane, and a separation layer between said first conductive fabric plane and said active region of said fabric ribbon wherein:
said first conductive track and said second conductive track are electrically connected to opposite ends of said first conductive fabric plane to generate a voltage gradient across said first conductive fabric plane; and
a conductive path is formed between said first conductive fabric plane and said third conductive track of said active region when manual pressure is applied to said active region.

2. A sensor according to claim 1, wherein said fabric is produced by a weaving process in which weft yarns are woven between warp yarns and the conducting yarns are included as part of the warp yarns.

3. A sensor according to claim 1, wherein the conductive yarns are silver coated nylon.

4. A sensor according to claim 1, wherein a conductive track is created from a plurality of conducting yarns.

5. A sensor according to claim 4, wherein each conductive track is created from between five and ten conducting yarns.

6. A sensor according to claim 1, wherein the insulating spacing between conductive tracks is wider than the width of the conductive tracks.

7. A sensor according to claim 6, wherein the spacing between conductive tracks is made consistent with readily available circuit connectors.

8. A sensor according to claim 7, wherein the spacing between conductive tracks is two point five millimeters.

9. A sensor according to claim 1 including masking means for defining active locations at positions on said active region.

10. A sensor according to claim 9, wherein said masking means includes a first mask and a second mask, wherein said first mask is located above said separation layer and a said second mask is located below said separation layer.

11. A sensor according to claim 9, including a cover sheet, wherein said cover sheet has graphical representations of device functions printed at respective positions of said active locations.

12. A sensor according to claim 1, wherein:
said separation layer includes a first insulating layer, a second conductive layer and a third insulating layer; and
both of said insulating layers allow conduction therethrough when manual pressure is applied but at least one will prevent conduction under conditions of bending.

13. A sensor according to claim 12, wherein said first conductive layer and/or said second conductive layer are fabricated from carbonised nylon.

14. A sensor according to claim 1, wherein said sensor is configured to be attached to a garment or a bag.

15. A sensor according to claim 14, wherein said sensor is configured to control personal electronic equipment such as a music player or a mobile telephone.

16. A manually operable analog position sensor constructed from fabric for providing control signals to an electronic device, comprising:
a first conductive fabric plane, a separation layer and a second conductive fabric plane;

a fabric ribbon having a length substantially longer than its width with insulating yarns and electrically conducting yarns included therein, such that said conducting yarns define a first conductive track, a second conductive track and a third conductive track, each said conductive track running the length of said fabric ribbon;

an active region of said fabric ribbon forming part of said analog sensor which is receptive to manually applied pressure, and a voltage measuring means configured to measure a voltage across two of the conductive tracks to determine said manually applied pressure; wherein said conductive tracks are configured to interface with an electronic device;

said first conductive track and said second conductive track are electrically connected to opposite ends of said first conductive fabric plane to allow a voltage gradient to be generated; and said separation layer is positioned between said first conductive fabric plane and said active region of said fabric ribbon and is configured to allow a conductive path to be formed between said first conductive fabric plane and said third conductive track when manual pressure is applied to said active region.

17. A sensor according to claim 16, including masking material for defining active locations of the sensor, in which a first mask is located above said separation layer and a second mask is located below said separation layer.

18. A method of constructing a manually operable position sensor for providing control signals to an electronic device, comprising the steps of:

weaving a fabric ribbon with electrically conducting warp yarns that defines a first conductive track, a second conductive track and a third conductive track, each said conductive track runs the length of fabric ribbon;

connecting each said conductive tracks at a first end to a connector for interfacing with an electronic device; and, at a second end forming a sensor assembly that is receptive to manually applied pressure over an active region of the fabric ribbon, the position of said manually applied pressure being determined by measuring a voltage across two of the conductive tracks; and placing a separation layer over the woven fabric and placing a first conductive fabric plane over said separation layer;

electrically connecting said first conductive track and said second conductive track to opposite ends of said first conductive fabric plane to generate a voltage gradient across said first conductive fabric plane such that a conductive path is formed between said first conductive plane and said third conductive track of said active region when manual pressure is applied to said active region.

19. A method according to claim 18, further comprising the step of applying masking for defining active locations.

* * * * *